United States Patent [19]

Ishikawa

[11] Patent Number: 4,975,851
[45] Date of Patent: Dec. 4, 1990

[54] ANTI-SKID CONTROL SYSTEM FOR AN AUTOMOTIVE BRAKE SYSTEM WITH QUICK RECOVERY OF VEHICULAR WHEEL SPEED

[75] Inventor: Yasuki Ishikawa, Tokyo, Japan

[73] Assignee: Nissan Motor Company Limited, Yokohama, Japan

[21] Appl. No.: 239,817

[22] Filed: Sep. 2, 1988

[51] Int. Cl.⁵ .............................. B60T 8/32
[52] U.S. Cl. ................. 364/426.02; 303/95; 303/110
[58] Field of Search .............. 364/426.02; 180/197; 303/95, 103, 110

[56] References Cited

U.S. PATENT DOCUMENTS 3,947,073  3/1976  Cattaneo et al. ............ 303/91
4,683,537  7/1987  Matsuda ................ 364/426.02
4,748,564  5/1988  Matsuda ................ 364/426.02
4,797,825  1/1989  Shimanuki et al. ............ 303/103

FOREIGN PATENT DOCUMENTS 2429301  2/1976  Fed. Rep. of Germany .

Primary Examiner—Gary Chin
Attorney, Agent, or Firm—Foley & Lardner, Schwartz, Jeffery, Schwaab, Mack, Blumenthal & Evans

[57] ABSTRACT

An anti-skid brake control system is associated with a mechanism which controls an engine revolution speed. The anti-skid brake control system includes means for monitoring a period of time in which anti-skid control is maintained in a RELEASE mode to decrease braking pressure. The monitoring means is responsive to the period of time exceeding a predetermined period for driving the engine speed control mechanism to temporarily accelerate the engine to assist recovery of the wheel speed.

10 Claims, 3 Drawing Sheets

ANTI-SKID CONTROL SYSTEM FOR AN AUTOMOTIVE BRAKE SYSTEM WITH QUICK RECOVERY OF VEHICULAR WHEEL SPEED

BACKGROUND OF THE INVENTION

1. Field of the Invention

The present invention relates generally to an anti-skid brake control system for an automotive vehicle. More specifically, the invention relates to an anti-skid brake control system which assures recovery of wheel speed even on a low friction road.

2. Description of the Background Art

As is well known, anti-skid brake control is performed generally for maintaining vehicular wheel slippage at an optimal range for obtaining optimum vehicular braking efficiency. In general, optimum braking efficiency can be obtained at about 10% to 20% of wheel slippage. Excessive wheel slippage causes skidding or locking of the wheel to lower braking efficiency. Therefore, it is typical in anti-skid brake control to reduce braking pressure in response to a wheel slippage increasing across a predetermined threshold which may be set in the optimal wheel slippage range. By reduction of the braking pressure, wheel speed is recovered to lower wheel slippage across the threshold. Recovery of the wheel speed generally occurs due to an inertial moment on a vehicular body and frictional reacting force from the road surface.

In the prior proposed anti-skid brake control systems, recovery of wheel speed simply depends on road friction. Therefore, the speed of recovery of wheel speed varies significantly depending upon the road surface friction. Namely, on the high friction road, the frictional reacting force is greater to cause quick recovery of the wheel speed. Alternatively, when the road surface is very slippy, such as on the icy road, the frictional reacting force becomes very small to delay recovery of the wheel speed. This clearly increases braking distance.

SUMMARY OF THE INVENTION

Therefore, it is an object of the present invention to provide an anti-skid brake control system which can assure quick recovery of wheel speed for quicker resumption of wheel grip.

Another object of the invention is to provide an anti-skid brake control system which is associated with an engine speed control mechanism for temporary acceleration of engine for aid of wheel speed recovery.

In order to accomplish aforementioned and other objects, an anti-skid brake control system, according to the present invention, is associated with a mechanism which controls an engine revolution speed. The anti-skid brake control system includes means for monitoring a period of time in which an anti-skid control mode is maintained in a RELEASE mode to decrease braking pressure. The monitoring means is responsive to the period to maintain the operational mode in the RELEASE mode exceeding a predetermined period for driving the engine speed control mechanism to temporarily accelerate the engine for assisting recovery of the wheel speed.

According to one aspect of the invention, an anti-skid control system for a brake system of an automotive vehicle which has an engine associated with an engine speed adjusting mechanism, comprises:

a hydraulic circuit including a wheel cylinder for exerting a braking pressure an a vehicular wheel for deceleration;

a hydraulic pressure adjusting means, disposed within the hydraulic circuit, for adjusting the hydraulic pressure to be delivered to the wheel cylinder, the pressure adjusting means being operable to increase braking pressure in the wheel cylinder in a first mode and to decrease braking pressure in the wheel cylinder in a second mode;

a wheel speed sensor for monitoring a rotation speed of the vehicular wheel to produce a wheel speed indicative data;

controller means for processing the wheel speed indicative data in order to derive a wheel slippage on the basis of the wheel speed indicative data and a control signal for the pressure adjusting means for switching the operational mode between the first and second modes so as to maintain wheel slippage close to a predetermined value, the controller means producing an engine acceleration command when the operational mode is maintained at the second mode for a given period of time for accelerating the engine to a given magnitude corresponding to the value of the engine acceleration command.

According to another aspect of the invention, an anti-skid control system for a brake system of an automotive vehicle which has an engine associated with an engine speed adjusting mechanism, comprises:

a hydraulic circuit including a wheel cylinder for exerting a braking pressure an a vehicular wheel for deceleration;

a hydraulic pressure adjusting means, disposed within the hydraulic circuit, for adjusting the hydraulic pressure to be delivered to the wheel cylinder, the pressure adjusting means being operable to increase braking pressure in the wheel cylinder in a first mode, to decrease braking pressure in the wheel cylinder in a second mode, and to hold the braking pressure constant in a third mode;

a wheel speed sensor for monitoring a rotation speed of the vehicular wheel to produce a wheel speed indicative data;

first means for deriving a wheel acceleration on the basis of the wheel speed indicative data;

second means for deriving a projected vehicular speed data by latching the wheel speed indicative data and calculating a deceleration magnitude based on a given deceleration gradient value;

third means for deriving a target wheel speed data on the basis of the projected vehicle speed data; and fourth means for detecting the wheel acceleration decreasing across a given deceleration threshold to produce a first control signal ordering the third mode, detecting a wheel speed decreasing across the target wheel speed to produce a second control signal ordering the second mode, detecting wheel acceleration increasing across a given wheel acceleration threshold to produce a third control signal ordering the third mode, and detecting wheel acceleration decreasing across the wheel acceleration threshold to produce a fourth control signal ordering the first mode; and fifth means for detecting the operational mode maintained in the second mode longer than a given period of time for producing an engine acceleration command for accelerating the engine to a given magnitude corresponding to the value of the engine acceleration command.

Preferably, the fifth means varies the engine acceleration command depending upon the length of period in which the operational mode is maintained at the second mode. In the alternative, the anti-skid brake control system further comprises detector means for detecting a vehicular speed lower than a predetermined threshold value to disable production of the engine acceleration command.

The fifth means may derive the engine acceleration command at a first value for engine acceleration at a first magnitude when the period in which the operational mode is maintained at the second mode is longer than a first time threshold and at a second value greater than the first value for engine acceleration at a second magnitude greater than the first magnitude when a period in which the operational mode is maintained in the second mode is longer than a second time threshold which is set longer than the first time threshold. The fifth means may also be responsive to switching the operational mode from the second mode to the first mode for terminating the engine acceleration command.

DESCRIPTION OF THE PREFERRED EMBODIMENT

Figure 1:
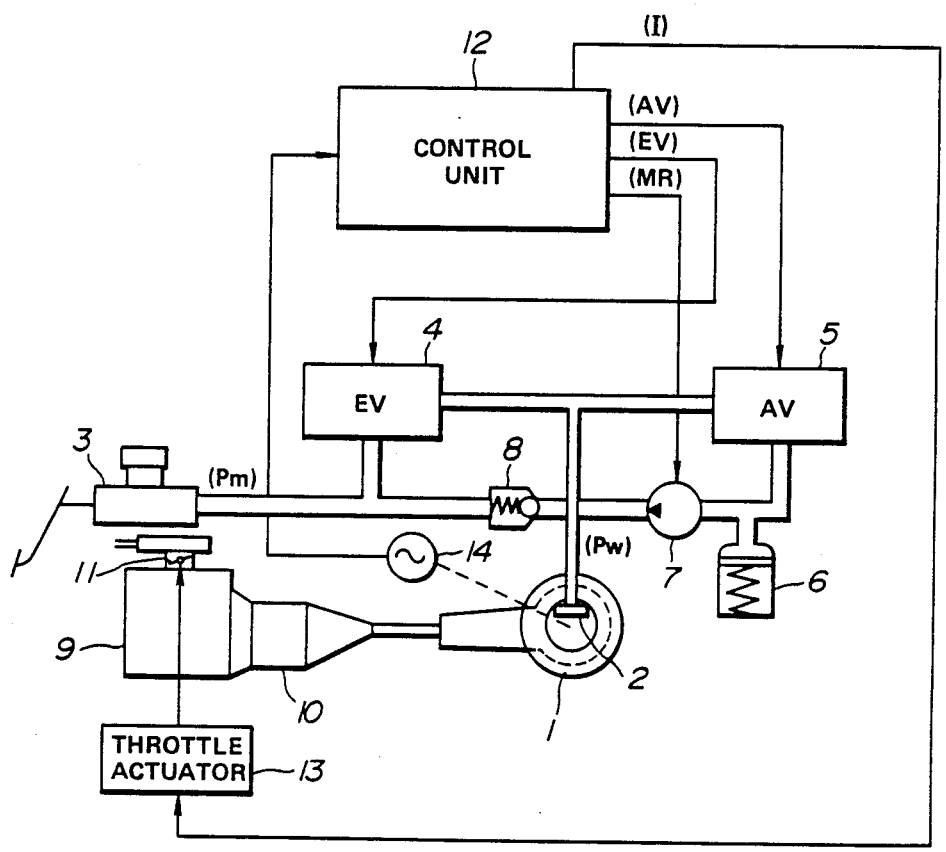
FIG. 1 is a schematic block diagram of the preferred embodiment of an anti-skid brake control system according to the invention, which is associated with an engine speed, control mechanism.

Referring now to the drawings, particularly to FIG. 1, the preferred embodiment of an anti-skid brake control system, according to the invention, is generally designed for controlling hydraulic pressure to be exerted on a wheel cylinder 2 which is associated with a vehicular wheel 1. The wheel cylinder 2 is connected to a brake master cylinder 3 via a hydraulic circuit. In the hydraulic circuit connecting the master cylinder 3 and the wheel cylinder 2, a braking pressure control assembly is disposed. The braking pressure control assembly generally comprises an inlet (EV) valve 4, an outlet (AV) valve 5, a pressure accumulator 6, a drain pump 7 and a one-way check valve 8. The vehicular wheel 1 is also associated with a drive mechanism including an automotive engine 9 and a power transmission 10. As is well known, the engine 9 has an air induction system, in which a throttle valve 11 is disposed for controlling an intake air amount for adjusting the engine revolution speed.

The EV valve 4 and the AV valve 5 comprise normally closed electromagnetic valves which can be operated by an inlet control signal (EV control signal) and an outlet control signal (AV control signal) from a control unit 12. The control unit 12 also produces a drain pump control signal (MR signal) for controlling operation of the drain pump 7. The control unit 12 is further connected to a throttle actuator 13 which is mechanically connected to the throttle valve 11 for driving the latter to the desired angular position, for feeding a throttle control signal (I signal) for controlling a throttle valve angular position and thereby for controlling the engine revolution speed. On the other hand, the control unit 12 is connected to a wheel speed sensor 14 to receive therefrom a wheel speed indicative sensor signal.

In the shown construction of the anti-skid brake control system, the anti-skid brake control is performed by controlling the EV and AV valves 4 and 5 in open and close positions according to the operational modes. In an APPLICATION mode, the EV valve 4 opens to connect the master cylinder 3 to the wheel cylinder 2 and the AV valve 5 closes to block fluid communication from pressure drain line in which the pressure accumulator 6, the drain pump 7 and the one-way check valve 8 are disposed. Therefore, the hydraulic braking pressure built-up in the master cylinder 3 is introduced into the wheel cylinder 2 for increasing the braking pressure in the APPLICATION mode. On the other hand, in a RELEASE mode, the EV valve 4 is closed to block fluid communication between the master cylinder 3 and the wheel cylinder 2, and the AV valve 5 is open to establish fluid communication between the wheel cylinder 2 and the drain line to decrease the braking pressure in the wheel cylinder. Both of the EV and AV valves 4 and 5 are operated in the closed position for blocking fluid communication between the master cylinder 3 and the wheel cylinder and between the wheel cylinder and the drain line to maintain the braking pressure in the wheel cylinder constant, in a HOLD mode.

In the normal state in which anti-skid brake control is not active, the operational mode of the braking pressure control assembly is maintained in APPLICATION mode by opening the EV valve 4 by the HIGH level EV signal and by closing the AV valve 4 by the LOW level AV signal. At this state, the MR signal is maintained LOW level so that the drain pump 7 is held inactive. Also, the I signal is held to have zero valve. By this, the hydraulic pressure Pm built-up in the master cylinder 3 is directly transferred to the wheel cylinder 2 via the opening EV valve 4 in order to increase the braking pressure Pw in the wheel cylinder linearly proportional to the output hydraulic pressure of the master cylinder. At the same time, the angular position of the throttle valve 11 varies simply depending upon the magnitude of depression of an accelerator pedal (not shown).

Generally, anti-skid control becomes active in response to increasing of braking pressure which increases the tendency of wheel locking. Basically, the operational mode of the braking pressure control assembly is switched from the APPLICATION mode to the HOLD mode in response to wheel deceleration greater than a given deceleration threshold during APPLICATION mode operation. The operational mode of the braking pressure control assembly is switched from the HOLD mode to the RELEASE mode when wheel slippage becomes greater than a predetermined wheel slippage threshold during HOLD mode operation. The operational mode of the braking pressure control assembly is switched from the RELEASE mode to the HOLD in response to increasing of wheel acceleration across a given acceleration threshold during RELEASE mode operation. The operational mode of the braking pressure control assembly is switched from the HOLD mode to the APPLICATION mode in response to decreasing of the wheel acceleration across the given acceleration threshold. Therefore, the operational mode of the pressure control assembly varies in order of APPLICATION mode, HOLD mode, RELEASE mode and HOLD mode in each skid cycle.

The MR signal becomes HIGH level in response to the first occurrence of the wheel deceleration increasing across the deceleration threshold and is maintained HIGH level throughout the period, in which the anti-skid control is active.

The signal value of the I signal is increased when the operational mode of the pressure control assembly is maintained in the RELEASE mode for a period longer than a given period. By increasing the signal value of the I signal, the throttle valve open angle is increased for accelerating the engine 9 irrespective of the accelerator pedal position. For adjusting the throttle valve angular position, the throttle actuator 13 comprises a rotary solenoid which drives the throttle valve in a magnitude proportional to the I signal level.

Figure 2:
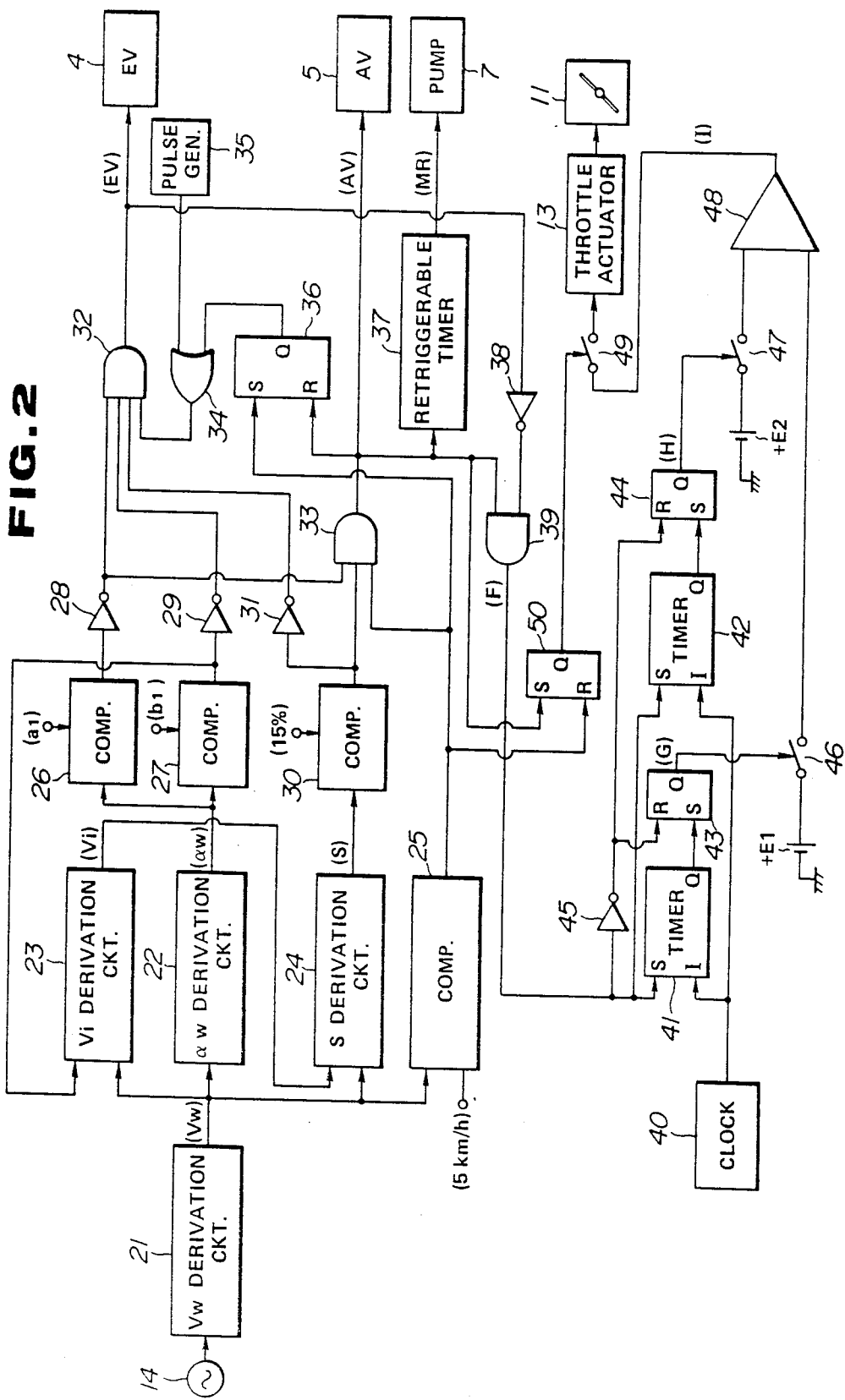
FIG. 2 is a block diagram of a control circuit in the anti-skid brake control system of FIG. 1.

Detailed construction of the circuitry of the anti-skid brake control system including the control unit 12 will be discussed herebelow with reference to FIG. 2.

As is well known, the wheel speed sensor 14 is designed to produce a wheel speed indicative alternating wave signal having a frequency proportional to the rotation of the wheel. The wheel speed sensor 14 is connected to a wheel speed derivation circuit 21. The wheel speed derivation circuit 21 generally comprises a frequency-to-voltage converter circuit and converts the alternating current signal into a voltage signal having a voltage level proportional to the frequency of the wheel speed indicative alternating wave signal. The wheel speed derivation circuit 21 produces a wheel speed indicative voltage signal and derives a wheel speed indicative data Vw on the basis of the wheel speed indicative voltage signal and a constant derived on the basis of the radius of the wheel. The wheel speed derivation circuit 21 feeds the wheel speed indicative data Vw to a wheel acceleration derivation circuit 22, a projected vehicular speed data derivation circuit 23, a wheel slippage derivation circuit 24, and a wheel speed comparator 25.

The wheel acceleration derivation circuit 22 comprises a differentiation circuit which differentiate the wheel speed indicative data Vw to derive a wheel acceleration indicative data aw. The wheel acceleration derivation circuit 22 is connected to a wheel acceleration comparators 26 and 27 to feed the derived wheel acceleration indicative data aw thereto. The wheel acceleration comparator 26 is also connected to an acceleration threshold generator circuit (not shown) to receive an acceleration threshold data $a_1$. The wheel acceleration comparator 26 produces a HIGH level comparator signal when the wheel acceleration indicative data aw is increased to be greater than the acceleration threshold $a_1$. Similarly, the wheel acceleration comparator 27 is connected to a deceleration threshold generator circuit (not shown) to receive a deceleration threshold data $b_1$. The wheel acceleration comparator 27 compares the wheel deceleration indicative data $-aw$ and the deceleration threshold data $b_1$ to produce a HIGH level comparator signal when the magnitude of deceleration as represented by the deceleration indicative data $-aw$ becomes greater than the deceleration threshold $b_1$.

The acceleration comparator 26 is connected to an AND gate 32 via an inverter 28. Similarly, the acceleration comparator 27 is connected to the AND gate 32 via an inverter 29.

The projected vehicular speed representative data Vi derivation circuit 23 generally outputs the wheel speed indicative data Vw as the projected vehicular speed representative data Vi as long as wheel lock does not occur. The projected vehicular speed representative data Vi derivation circuit 23 is connected to the acceleration comparator 27 and is responsive to the HIGH level comparator signal to latch the wheel speed indicative data Vw as a data representative of the vehicular speed. Based on the latched wheel speed indicative data Vw and a vehicular deceleration indicative gradient data, the projected vehicular speed representative data Vi derivation circuit 23 derives a projected vehicular speed representative data Vi. The projected vehicular speed representative data derivation circuit 23 is connected to the wheel slippage derivation circuit 24 to feed the projected vehicular speed representative data Vi.

The wheel slippage derivation circuit 24 receives the wheel speed indicative data Vw and the projected vehicular speed representative data Vi to derive the wheel slippage data S based thereon. Practically, the wheel slippage data S is derived by the following equation:

$$S = \{(Vi - Vw)/Vi\} \times 100 \qquad (\%)$$

The wheel slippage data S is fed to a wheel slippage comparator 30. The wheel slippage comparator 30 is connected to a slippage threshold generator circuit (not shown) to receive therefrom a wheel slippage threshold $S_{ref}$ which is representative of a predetermined wheel slippage, e.g. 15%. The wheel slippage comparator 30 compares the wheel slippage data S with the wheel slippage threshold $S_{ref}$ to produce a HIGH level comparator signal when the wheel slippage data increases across the wheel slippage threshold. The wheel slippage comparator 30 is connected to the AND gate 32 via an inverter 31. The wheel slippage comparator 30 is also connected to an AND gate 33. The AND gate 33 is also connected to the inverter 28 to receive the inverted comparator signal of the wheel acceleration comparator 26. The AND gate 33 is further connected to the wheel speed comparator 25 which compares the wheel speed indicative data Vw with a reference speed data $Vw_{ref}$ which represents a wheel speed at low vehicle speed, e.g. 5 km/h. The wheel speed comparator 25 maintains the comparator signal at the level LOW level while the wheel speed indicative data Vw is maintained smaller the reference speed data $Vw_{ref}$. Namely, since the reference speed data represents a substantially low vehicle speed, the wheel speed indicative data smaller than the reference speed data represents that the vehicle is substantially stopping. On the other hand, when the wheel speed indicative data Vw becomes greater than or equal to the reference speed data $Vw_{ref}$, the wheel speed comparator 25 feeds a HIGH level comparator signal to the AND gate 33. As will be seen from FIG. 2, the wheel speed comparator 25 is connected to a SET input terminal of a flip-flop 36. The flip-flop 36 is connected to the AND gate 33 at the RESET input terminal. Therefore, the flip-flop 36 outputs a HIGH level signal while it is set by the HIGH level comparator signal from the wheel speed comparator 25 and LOW level signal while it is reset by the HIGH level gate signal of the AND gate 33. The gate signal serves as the AV signal.

The AND gate 32 is further connected to an OR gate 34 which is connected to a pulse generator 35 and the flip-flop 36. The pulse generator 35 is designed to intermittently produce HIGH level pulse signals. The pulse signal generated by the pulse generator 35 is used for increasing the braking pressure Pw in a stepwise fashion. Since the OR gate 34 is also connected to the flip-flop, the gate signal of the OR gate 34 is maintained HIGH level, as long as the flip-flop is set. The AND gate 32 detects the AND condition established by the HIGH level inputs from the inverters 28, 29 and 31 and the HIGH level gate signal from the OR gate 34 to produce a HIGH level EV signal to the EV valve 4.

The AND gate 33 is connected to a retriggerable timer 37. The retriggerable timer 37 is designed to be triggered every leading edge of the HIGH level gate signal of the AND gate 33 as the AV signal. The time constant of the retriggerable timer 37 is set at a value longer than a possible longest period of a skid cycle so that the timer signal level as the MR signal is maintained HIGH level over skid cycles throughout the period in which anti-skid brake control is active.

The AV signal is also fed to an AND gate 39. To the other input terminal, the EV signal is input via an inverter 38. The output terminal of the AND gate 39 is connected to a timer 41, to which a clock generator 40 is connected. The timer 41 is designed to be set by the HIGH level gate signal F of the AND gate 39 and counts up the clock pulse generated by the clock generator 40. The timer 41 produces a HIGH level timer signal when the counter timer value reaches a preset value $T_1$. The clock generator 40 is also connected to a timer 42. Similarly to the timer 41, the timer 42 is designed to be set by the HIGH level gate signal F of the AND gate 39 and counts up the clock pulse generated by the clock generator 40. The timer 42 produces a HIGH level timer signal when the counter timer value reaches a preset value $T_2$. The AND gate 39 is also connected to the reset input terminal of a flip-flop 43 via an inverter 45. The flip 43 has a set input terminal connected to the output terminal of the timer 41. The output terminal of the flip-flop 41 is connected to a relay switch 46 which is interposed between a constant voltage source $+E_1$ and an adder 48. The AND gate 39 is also connected to the set input terminal of a flip-flop 44 via the inverter 45. The flip-flop 44 has a reset input terminal connected to the timer 42. The flip-flop 44 is connected to a relay switch 47 interposed between a constant voltage source $+E_2$ and the adder 48. The adder 48 has the output terminal connected to the throttle actuator 13 via a relay switch 49. The relay 49 is operated ON and OFF by an output signal of a flip-flop 50.

The AV signal is further connected to the set input terminal of a flip-flop 50. The reset input terminal of the flip-flop 50 is connected to the wheel speed comparator 25.

Figure 3:
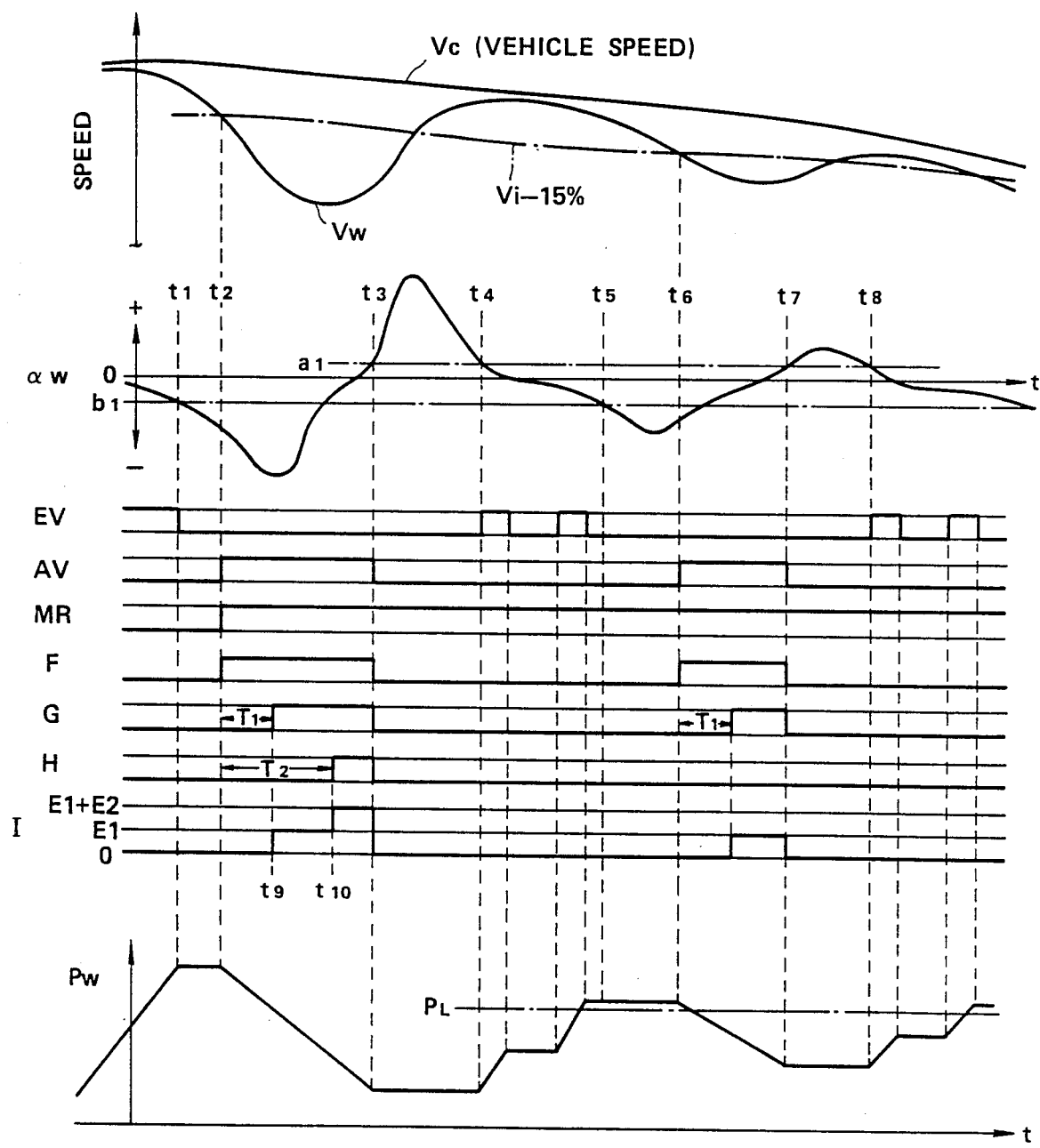
FIG. 3 is a timing chart showing operation of the shown embodiment of the anti-skid brake control system according to the invention.

Operation of the shown embodiment of the anti-skid brake control system set forth above will be discussed herebelow with reference to the timing chart of FIG. 3. In the shown process, the pressure control assembly is initially maintained in APPLICATION mode. Therefore, the braking pressure Pw increases according to increasing of the hydraulic pressure built-up in the master cylinder 3. At this condition, assuming the wheel speed indicative data Vw is greater than the reference speed data $Vw_{ref}$, the input of the OR gate 35 is maintained HIGH level. In addition, since the wheel acceleration indicative data aw is maintained smaller than the acceleration threshold $a_1$ and greater than the deceleration threshold $b_1$, the inputs to the AND gate 32 via the inverters 28 and 29 are maintained HIGH level. Furthermore, at this time, since the wheel slippage indicative data S is maintained smaller than the slippage threshold $S_{ref}$, the input of the AND gate 32 from the wheel slippage comparator 30 via the inverter 31 is maintained HIGH. Therefore, the AND condition is established in the AND gate 32 resulting in a HIGH level EV signal. On the other hand, because of the LOW level comparator signal of the wheel slippage comparator 30, the AND condition in the AND gate 33 is not established. Therefore, the AV signal as the output of the AND gate 33, is maintained at LOW level.

Since the AV signal is maintained LOW level, the retriggerable timer 37 is held inactive. At the same time, the AND condition in the AND gate 50 is not established due to the LOW level AV signal. The flip-flop 50 is in the reset position by the HIGH level input from the wheel speed comparator 25. At this time, the timers 41 and 42 are held inoperative due to the LOW level input from the AND gate 39.

By increasing the braking pressure in the wheel cylinder 2, the wheel 1 is decelerated to increase the magnitude of deceleration. This is reflected in decreasing of the wheel acceleration indicative data aw to be derived by the wheel acceleration derivation circuit. At a time $t_1$, wheel acceleration indicative data aw decreases across the deceleration threshold $b_1(-)$, then, the comparator signal of the wheel acceleration comparator 27 turns into HIGH level to input a LOW level signal to the AND gate 32 via the inverter 29 to destroy the AND condition. As a result, the EV signal turns into LOW level to shut the EV valve 4. This results in blocking of fluid communication between the master cylinder 3 and the wheel cylinder 2.

At this time, since the wheel slippage data S is still maintained at a greater value than the wheel slippage threshold $S_{ref}$, the comparator signal of the wheel slippage comparator 30 is maintained LOW level to maintain the AND gate 33 non-condutive. As a result, the AV signal is held LOW level to maintain the AV valve closed. Therefore, the braking pressure Pw is maintained at constant value.

Because the AV signal is held unchanged, the status of the flip-flop 50 and the retriggerable timer 37 are held unchanged. On the other hand, because of LOW level EV signal, the input to one input terminal of the AND gate 39 via the inverter 38 turns into HIGH level. However, because of the LOW level AV signal, the gate output of the AND gate 39 is maintained LOW level so as to make the status of the timers 41 and 42 unchanged.

By maintaining the braking pressure Pw constant at the increased level, the wheel is further decelerated to decrease wheel speed Vw and to increase the wheel slippage S across the wheel slippage threshold $S_{ref}$, i.e. 15% in the shown embodiment, at a time $t_2$. The wheel slippage comparator 30 is responsive to this to output a HIGH level comparator signal. Then, the AND condition in the AND gate 33 is established to cause switching of the AV signal from LOW level to HIGH level. The retriggerable timer 37 is responsive to the leading edge of the HIGH level AV signal to output a HIGH level signal as the MR signal to drive the drain pump. At the same time, because of the HIGH level AV signal, the AND condition in the AND gate 39 is established to trigger the timers 41 and 42. Furthermore, by the HIGH level AV signal, the flip-flop 50 is set to output a HIGH level signal to the relay switch 49 to close the latter.

Then, the timers 41 and 42 start counting up the clock pulse from the clock generator 40. After a $T_1$ period set in the timer 41, the timer signal turns to HIGH level to set the flip-flop 43. The flip-flop 43 as set by the HIGH level timer signal outputs a HIGH level signal to energize the relay switch 46 for connecting the constant voltage source $+E_1$ to the adder 48. Since the $T_2$ period set in the timer 42 is longer than the $T_1$ period, the timer signal of the timer 42 is maintained LOW level. Since the relay switch 49 is closed by the HIGH level signal from the flip-flop 50, the output representative of the $+E_1$ value is output from the adder 48 to the throttle actuator 13. Therefore, the throttle actuator 13 drives the throttle valve 11 to increase the throttle valve open angle in a magnitude corresponding to the $+E_1$ value. This causes engine acceleration to transmit the driving torque to the wheel 1. After a $T_2$ to period set in the timer 42, the timer signal turns to HIGH level to set the flip-flop 44. The flip-flop 44 as set by the HIGH level timer signal outputs a HIGH level signal to energize the relay switch 47 for connecting the constant voltage source $+E_2$ to the adder 48. By this the output voltage of the adder 48 becomes a sum value of $+E_1$ and $+E_2$. Therefore, the adder output representative of the $(+E_1 + +E_2)$ value is output from the adder 48 to the throttle actuator 13 for driving the throttle valve 11 to further increase the throttle valve open angle in a magnitude corresponding to the $(+E_1 + +E_2)$ value. This causes further engine acceleration to transmit the driving torque to the wheel 1. By this recovery of the wheel speed is quicker than would normally occur without assistance of the engine.

During the process set forth above, the wheel acceleration increases according to resumption of the wheel speed. The wheel acceleration indicative data aw increases across the acceleration threshold $a_1$, at a time $t_3$. At this time, since the wheel acceleration indicative data aw already becomes greater than the deceleration threshold $b_1$, the output of the wheel acceleration comparator 27 is maintained LOW level. At the time $t_3$, since the wheel acceleration indicative data aw is greater than or equal to the acceleration threshold $a_1$, the comparator signal of the wheel acceleration comparator 26 turns into HIGH level. This causes LOW level input via the inverter 28 to destroy the AND condition in the AND gate 33. Therefore, the AV signal is turned to LOW level to close the AV valve 5. On the other hand, by the LOW level AV signal, the AND condition of the AND gate 39 is destroyed. The LOW level gate signal of the AND gate 39 is inverted by the inverter 45 and serves as a HIGH level reset signal for the flip-flops 43 and 44. By resetting the flip-flops 43 and 44, the relay switches 46 and 47 are deenergized to disconnect the constant voltage sources $+E_1$ and $+E_2$ from the adder 48. Therefore, the output of the adder, as the I signal, becomes zero.

By holding the braking pressure Pw constant at a decreased level, wheel acceleration aw which was over-shooted, returns to the speed corresponding to the current vehicle speed. During this, wheel acceleration indicative data aw decreases across the acceleration threshold $a_1$, at a time $t_4$. Since the wheel speed representative data Vw becomes higher than a target wheel speed which represents the desired wheel slippage, i.e. 15% lower than the projected vehicular speed representative data Vi, during the period between $t_3$ and $t_4$, the wheel slippage comparator signal is turned into LOW level. Therefore, by changing the comparator signal of the wheel acceleration comparator 26, all of the comparator signals of the comparators 26, 27 and 28 become LOW level. At this time, since the flip-flop 36 is reset by the HIGH level AV signal in the preceding skid cycle, the gate signal of the OR gate 34 turns to HIGH level for the period in which the HIGH level pulse signal is input from the pulse generator 35. Therefore, when the HIGH level pulse signal is input from the pulse generator 35, inputs to the AND gate 32 via the inverters 28, 29 and 30 and the OR gate 34 become HIGH to establish the AND condition. As a result, the EV signal turns to HIGH level to open the EV valve 4. Therefore, the operational mode returns to APPLICATION mode, at the time $t_4$. As seen from FIG. 3, since the pulse generator 35 intermittently produces the pulse signal, the operational mode is alternatively switched between APPLICATION mode and HOLD mode for increasing the braking pressure in stepwise fashion. This technology is advantageously introduced for maintaining the braking pressure Pw close to a lock pressure $P_L$ around which wheel locking occurs.

At a time $t_5$, the wheel acceleration indicative data aw again decreases across the deceleration threshold $b_1$. Then, the comparator signal level of the wheel acceleration comparator 27 turns to HIGH level to destroy the AND condition in the AND gate 32 similarly to that at the time $t_1$. Thus, the operational mode turns into HOLD mode. Therefore, through the period including times $t_5$, $t_6$, $t_7$ and $t_8$, the operational mode is switched in order as discussed with respect to the times $t_1$, $t_2$, $t_3$ and $t_4$. It should be appreciated that, in the second cycle from $t_5$ to $t_8$, the period between $t_6$ and $t_7$ is shorter than the $T_2$ period set in the timer 42. Therefore, during this period, the engine acceleration magnitude corresponds to the constant voltage $+E_1$.

As will be appreciated herefrom, the shown embodiment successfully recovers the wheel speed by temporarily accelerating the engine. Furthermore, since the shown embodiment introduces a RELEASE mode period dependent an engine acceleration magnitude, acceleration of the engine simply assist recovery of wheel rotation and will never affect braking efficiency.

Therefore, the present invention fulfills all of the objects and advantages sought therefor.

What is claimed is:

1. An anti-skid control system for a brake system of an automotive vehicle which has an engine associated with an engine speed adjusting mechanism, said anti-skid control system comprising:

a hydraulic circuit including a wheel cylinder for exerting a braking pressure on a vehicular wheel to decelerate said vehicular wheel;

a hydraulic pressure adjusting means, disposed within said hydraulic circuit for adjusting hydraulic pressure to be delivered to said wheel cylinder, said pressure adjusting means being operable to increase braking pressure in said wheel cylinder in a first mode and to decrease braking pressure in said wheel cylinder in a second mode;

a wheel speed sensor for monitoring a rotation speed of said vehicular wheel to produce a wheel speed indicative data;

controller means for processing said wheel speed indicative data in order to derive a wheel slippage based on said wheel speed indicative data and for generating a control signal for said pressure adjusting means for switching an operational mode between said first and second modes so as to maintain wheel slippage close to a predetermined value, said controller means producing an engine acceleration command, when said operational mode is maintained at said second mode for a given period of time, for accelerating said engine by a given magnitude corresponding to a value of said engine acceleration command.

2. An anti-skid brake control system as set forth in claim 1, wherein said controller means varies said engine acceleration command depending upon a length of a period in which said operational mode is maintained at said second mode.

3. An anti-skid brake control system as set forth in claim 1, which further comprises detector means for detecting vehicular speed lower than a predetermined threshold value to disable production of said engine acceleration command.

4. An anti-skid brake control system as set forth in claim 2, wherein said controller means derives said engine acceleration command at a first value for engine acceleration at a first magnitude when said period in which said operational mode is maintained at said second mode is longer than a first time threshold and at a second value greater than said first value for engine acceleration at a second magnitude greater than said first magnitude when a period in which said operational mode is maintained in said second mode is longer than a second time threshold which is set longer than said first time threshold.

5. An anti-skid brake control system as set forth in claim 4, wherein said controller means is responsive to switching of said operational mode from said second mode to said first mode for terminating said engine acceleration command.

6. An anti-skid control system for a brake system of an automotive vehicle which has an engine associated with an engine speed adjusting mechanism, said anti-skid control system comprising:
- a hydraulic circuit including a wheel cylinder for exerting a braking pressure on a vehicular wheel to decelerate said vehicular wheel;
- a hydraulic pressure adjusting means, disposed within said hydraulic circuit, for adjusting hydraulic pressure to be delivered to said wheel cylinder, said pressure adjusting means being operable to increase braking pressure in said wheel cylinder in a first mode, to decrease braking pressure in said wheel cylinder in a second mode, and to hold braking pressure constant in a third mode;
- a wheel speed sensor for monitoring a rotation speed of said vehicular wheel to produce a wheel speed indicative data;
- first means for deriving a wheel acceleration based on said wheel speed indicative data;
- second means for deriving a projected vehicular speed data by latching said wheel speed indicative data and calculating a deceleration magnitude based on a given deceleration gradient value;
- third means for deriving a target wheel speed based on said projected vehicular speed data;
- fourth means for detecting said wheel acceleration decreasing below a given deceleration threshold to produce a first control signal executing said third mode, detecting a wheel speed decreasing below said target wheel speed to produce a second control signal executing said second mode, detecting wheel acceleration increasing above a given wheel acceleration threshold to produce a third control signal executing said third mode, and detecting wheel acceleration decreasing below said wheel acceleration threshold to produce a fourth control signal executing said first mode; and
- fifth means for detecting said operational mode being maintained in said second mode longer than a given period of time for producing an engine acceleration command for accelerating said engine by a given magnitude corresponding to a value of said engine acceleration command.

7. An anti-skid brake control system as set forth in claim 6, wherein said fifth means varies said engine acceleration command depending upon a length of a period in which said operational mode is maintained at said second mode.

8. An anti-skid brake control system as set forth in claim 6, which further comprises detector means for detecting vehicular speed lower than a predetermined threshold value to disable production of said engine acceleration command.

9. An anti-skid brake control system as set forth in claim 7, wherein said fifth means derives said engine acceleration command at a first value for engine acceleration at a first magnitude when said period in which said operational mode is maintained at said second mode is longer than a first time threshold and at a second value greater than said first value for engine acceleration at a second magnitude greater than said first magnitude when a period in which said operational mode is maintained in said second mode is longer than a second time threshold which is set longer than said first time threshold.

10. An anti-skid brake control system as set forth in claim 9, wherein said fifth means is responsive to switching of said operational mode from said second mode to said first mode for terminating said engine acceleration command.

* * * * *

UNITED STATES PATENT AND TRADEMARK OFFICE
CERTIFICATE OF CORRECTION

PATENT NO. : 4,975,851
DATED : December 4, 1990
INVENTOR(S) : Yasuki ISHIKAWA

It is certified that error appears in the above—identified patent and that said Letters Patent is hereby corrected as shown below:

On the title page, Item 30, Foreign Application Priority Data, please insert the following:
--September 5, 1987 [JP] Japan.............62-221192--.

Signed and Sealed this

Twenty-second Day of December, 1992

Attest:

DOUGLAS B. COMER

*Attesting Officer*      *Acting Commissioner of Patents and Trademarks*